Patented July 28, 1936

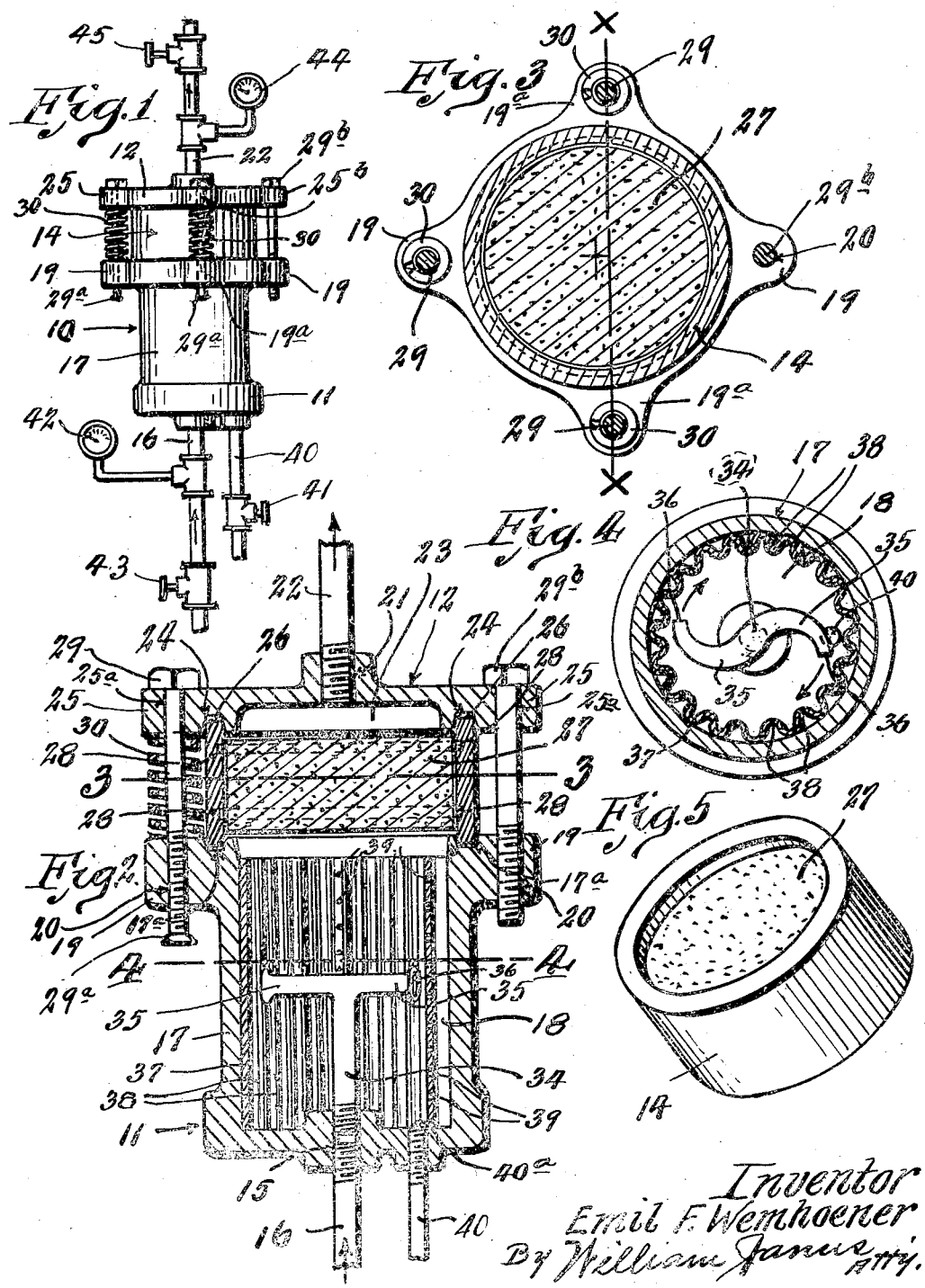

2,048,718

UNITED STATES PATENT OFFICE 2,048,718

FILTER

Emil F. Wemhoener, St. Louis, Mo.

Application May 17, 1934, Serial No. 726,040

11 Claims. (Cl. 183—44)

This invention relates generally to filters and more particularly to filters for filtering out or separating moisture, oil, and other liquids from air or other gaseous substances.

In this type of filters a disk of porous material, such as carbon, carborundum, and the like, is interposed in a pipe connection in the path of the gas to be filtered. This filtering medium has to be cleaned at regular intervals. In most filters this is accomplished by forcing, under pressure and in a direction reverse to the normal flow, a cleansing medium, such as water, through the filtering device, thereby cleaning the filtering medium and carrying away the impurities lodged on the inlet side of the filtering disk. This method is expensive and slow and in many cases is not satisfactory or practicable. It is expensive, as it takes the device out of service for a long period of time and requires additional pipe connections. In other cases the entire device has to be dismantled to provide access to the filtering disk or to permit the removal thereof.

One of the objects of the present invention is the provision of a filter device comprising a casing having an inlet head and an outlet head and an intermediate tubular member interposed therebetween and having its ends held in fluid-tight connection therewith, said tubular member or casing having fixed therein a filtering disk of porous material through which the fluid to be filtered is caused to travel, said casing being removable from between said heads for cleaning purposes without disassembling said heads or disturbing the connections thereof.

Another object of the invention is to provide a filter device having an intermediate removable portion containing the filtering medium, whereby said portion can be removed and replaced by a clean one without disassembling said device or disconnecting the connections thereof so that the change of filters can be accomplished in a short period of time and with a minimum amount of labor.

A further object of the invention is to provide a filtering device comprising a pair of spaced-apart end members, a tubular intermediate member adapted to have its ends enter in fluid-tight engagements with said end members, and containing a filtering medium of porous material through which the fluid is caused to pass in traversing said device, and means for clamping said members in fluid-tight relationship with each other, said means being operable to release said tubular member and permit removal thereof without disturbing said end members or the connections of same.

Additional objects of the invention are generally to improve upon filters of the class described.

With these and other objects in view, my invention consists in certain novel features of construction and arrangement of parts, hereinafter more fully described and claimed, and illustrated in the accompanying drawing, in which—

Figure 1 is a side elevational view of my improved filter device and its connections.

Figure 2 is an enlarged vertical cross section through the same.

Figure 3 is a horizontal cross section taken on line 3—3 of Figure 2.

Figure 4 is a horizontal cross section taken on line 4—4 of Figure 2.

Figure 5 is a perspective detail view of the removable filtering medium.

My filter can be used advantageously in all instances where it is desired to use air or other gaseous fluid free of moisture, oil, dust or other impurities. Thus in painting establishments employing spraying outfits it is very important that the air utilized for spraying be free from moisture as the presence of the latter in the air causes blisters on the painted surfaces. Also in the manufacture of certain gases it is desirable to obtain gas free of impurities.

The filter device of my improved construction can be easily cleaned in the line and when the filtering medium is saturated with moisture, oil, or filled with other impurities, said filtering medium can be easily removed and a new one inserted without dismantling the device or removing it from its connections.

Referring by numerals to the accompanying drawing, 10 indicates a filter device comprising an inlet end member 11, an outlet end member 12, and an intermediate or filter member 14. The inlet member 11 which is provided at the lower end of the device is formed with a central opening 15 in which is screw-seated an inlet connection 16 by means of which air or other fluid to be filtered is supplied. This inlet or lower member 11 is formed with a cylindrical upward extension 17, thereby forming a chamber 18 between the intermediate or filter member 14 and the lower end of the device. The upper end of extension 17 is provided with an annual groove 17a and four outwardly and laterally extending lugs 19. These lugs are formed integral with the upper end of said cylindrical extension 17 and are each formed with a bore 20 disposed parallel with the axis of the filter. Two of the lugs are arranged in diametrically opposed relationship with each other, while the other two lugs 19a, although arranged in opposed relationship with each other, are offset to one side of the center of the device, as indicated by x—x in Figure 3.

The upper or outlet member 12 is provided with a central screw-threaded bore 21 which receives an outlet connection 22. A chamber 23 is thus formed between intermediate member 14 and the upper end of the device. The underside of member 12 is formed with an annular groove 24 which is of the same diameter and cross sectional dimensions as the groove 11a of member 11. Four lugs 25 are formed integral with member 12 and extend laterally therefrom, each of said lugs being provided with a bore 25a. Lugs 25 are so spaced that the bores thereof are axially aligned with the bores of the corresponding lugs 19 of the lower member 11, one pair of opposed lugs 25b being offset to one side of the center of the device to correspond with the offset lugs 19a of the lower member.

The intermediate member 14 is in the shape of an open-ended cylinder, the ends of which fit in the grooves 11a and 24, respectively, of members 11 and 12. A gasket 26 is arranged in each groove to provide a seal between the ends of member 14 and the corresponding end members. A disk 27 of porous material, such as carbon, carborundum, and the like, is arranged in section or member 14. The thickness of this disk is less than the length of member 14 so that a clearance exists between each end of said disk and the corresponding end of section 14. This disk is preferably secured within member 14 by suitable cement. In order to provide a more efficient securement of the disk in said member 14 the interior surface of the latter is formed with two or more grooves 28 which receive the cement and insure a more secure bond between the cement and member 14.

The end members 11 and 12 are secured together by bolts 29 which extend through lugs 25 of the upper member 14 and have their lower screw-threaded ends screw-seated in lugs 19 of lower member 11. By tightening said bolts, members 11 and 12 can be drawn together and clamp therebetween said intermediate member 14 so that the ends of the latter are in fluid-tight engagement with said members 11 and 12. Three of the bolts 29 are provided with expansion coil springs 30 which are interposed between the respective lugs. The ends of these three bolts are offset as indicated at 29a so as to prevent removal of same from said lugs. The fourth bolt 29b is not provided with a coiled spring and is removable from its position in the lugs. Thus when it is desired to remove the intermediate section 14, the three first-mentioned bolts are loosened and the fourth bolt 29b is removed. Coiled springs 31 serve to raise the upper member 12 upwardly a suitable distance to permit the removal of member 14 laterally from its position between the lugs from which the bolt 29b has been removed.

By placing certain of the lugs to one side of the axis of the device, the action of the springs engaging these offset lugs is to raise the forward end of member 12 slightly higher than the rear end so that the intermediate member 14 can be readily removed and inserted in position. When a new member 14 is placed in position, bolt 29a is reinserted and all the bolts are tightened so as to seal the ends of said member 14.

A pipe connection 34 is screw-seated in the inner end of inlet opening 15 and extends upwardly about halfway within the cylindrical extension 17. The upper end of this pipe connection is provided with two laterally and oppositely disposed nozzles 35. These nozzles are curved in the same direction and their ends are flattened to form elongated discharge openings 36, the major axes of which are disposed vertically. Thus the fluid discharged within chamber 18 has imparted thereto whirling motion.

An open-ended tubular member 37 provided in its wall with longitudinally disposed corrugations 38 is inserted in the chamber 18 and fits snugly within the cylindrical portion 17. The inwardly presented crowns of corrugations 38 are each provided with a plurailty of spaced-apart apertures 39. Some of the air discharged into chamber 18 passes through these apertures into the vertically disposed chambers formed by corrugations 38. The moisture or oil or other liquid impurities contained in the air will collect on the corrugated surface of member 37 so that a portion of the moisture will be separated from the air before the latter reaches the filter of member 14.

The air or other fluid in entering the device through the inlet connection is discharged into the cylindrical portion through the nozzles 35. These being curved impart to the air whirling motion. Thus the air is caused to impinge on the corrugated surfaces of the insert 37. Some of the air passes through the apertures 39 into the corrugations 38 and then upwardly. The moisture contained in the air collects on the corrugated surfaces and drains downwardly. The air then passes upwardly in the cylindrical portion 17 and traverses the filter member 27. Such moisture or oil still contained in the air is collected on the surfaces formed by the interstices in said porous member 27 so that only air leaves said member and enters the chamber formed by outlet member 12.

When sufficient moisture or oil collects in member 27 so that the latter is unable to absorb any more, said member has to be removed and replaced with a new one, which is clean and dry. The old or saturated filter member can now be cleaned and dried, whereupon it is ready for use.

By virtue of the particular construction of my device, this replacement of the member 27 can be easily and quickly accomplished by removing bolt 29a and loosening the remaining bolts 29. Due to the action of springs 30, this automatically raises the upper member 12 so that the latter inclines forwardly or toward that end from which bolt 30a has been removed. Member 14 containing filter 27 can now be raised to bring the lower end of said casing 14 clear of the groove 11a so that said member can be moved laterally. When a new member 14 is placed in position, the ends thereof are brought in alignment with grooves 11a and 24 and all of the bolts, including bolt 29b, are tightened to provide a fluid-tight joint between the ends of member 14 and the end members 11 and 12. Thus it will be observed that the end members 11 and 12 are not removed and that the connections 16 and 22 thereof are not disconnected or disturbed.

The moisture collected in the lower end member 11 is drained therefrom by means of a pipe 40 which is screw-threaded in an opening 40a formed in said end member 11. A valve 41 closes said drain connection. Preferably inlet connection 16 is provided with a pressure gauge 42 and a shut-off valve 43, while the outlet connection is provided with a pressure gauge 44 and a shut-off valve 45. The valves are used to shut off the connections when removing the filter member 14. The gauges indicate the pressure in the line and the differences in the pressure registered by the gauges will indicate a range of fouling or accumulation of dirt on the filter.

Thus the filter member 14 can be easily removed and replaced without the use of any special tools and without the services of an experienced mechanic. It is not necessary to disengage the end members 10 and 12 from their respective pipe connections so that very little time is lost in replacing filter members 14.

Valves 43 and 45 provide ready means for shutting off the connections when the filter is to be changed and gauges 42 and 44 provide efficient means for ascertaining the condition of the filter.

While I have shown and described herein the preferred form of my filtering device, it is obvious that various changes in the construction and arrangement of parts can be made and substituted for those herein shown and described without departing from the spirit of my invention.

I claim:

1. A filter comprising a pair of spaced-apart end members, each of which is provided with an annular seat, one of which has an inlet and the other an outlet, a tubular member removably arranged between said end members and having its ends engaging the seats thereof, a filter disk of porous material fixed within said tubular member in spaced apart relation with the ends thereof, a plurality of bolts located exteriorly of said tubular member for securing said end members to said tubular member, one of said bolts being detachable to permit the removal of said tubular member in a lateral direction from between said end members, and an expansion spring arranged on each of the other bolts and engaging said end members for spreading said members apart when said bolts are loosened.

2. A filter comprising a pair of spaced-apart end members having an inlet and an outlet, respectively, each end member being provided with an annular seat, a tubular member removably disposed between said end members and having its ends seated in the respective seats, a disk of filter material secured within said tubular member in spaced-apart relation with the ends thereof, a plurality of bolts engaging said end members and located exteriorly of said tubular member for securing said end members to the ends of said tubular member to form a fluid-tight connection therewith, and expansion spring means interposed between said end members for spreading them apart when said bolts are loosened, one of said bolts being removable to permit the removal of said tubular member in a lateral direction from between said end members.

3. A filter comprising an inlet end member, an inlet connection secured thereto, an outlet end member, an outlet connection secured thereto, an open-ended tubular member removably interposed between said end members, a mass of filter material secured within said tubular member, a plurality of bolts engaging said end members for securing them against the ends of said tubular member, said bolts being located exteriorly of said tubular member and being operable to release said tubular member from said end members, one of said bolts being removable to permit removal of said tubular member in a lateral direction, and spring means interposed between said end members to cause the latter to spread apart and release said tubular member when said bolts are loosened.

4. A filter comprising an inlet end member, a plurality of outwardly projecting lugs formed integral therewith, an outlet end member, a plurality of lugs projecting outwardly therefrom, a tubular member interposed between said end members coaxially therewith, a plurality of bolts located exteriorly of said tubular member for engaging said lugs and forcing said end members in fluid-tight engagement with the ends of said tubular members, said bolts being operable to release said end members and permit removal of said tubular member in a lateral direction, a plurality of expansion springs interposed between said end members to cause them to be spread apart and release said tubular member, and a disk of porous filtering material secured within said tubular member in spaced-apart relation with the ends of said tubular member.

5. A filter comprising an inlet end member, a plurality of outwardly projecting lugs formed integral therewith, an outlet end member, a plurality of lugs projecting outwardly therefrom, each of said end members being formed with an annular seat, a gasket in each seat, a tubular member interposed between said end members coaxially therewith and having its ends seated in the respective seats, a plurality of bolts arranged exteriorly of said tubular member and engaging said lugs and forcing said end members in fluid-tight engagement with the ends of said tubular member, said bolts being operable to release said end members and one of said bolts being removable to permit the removal of said tubular member in a lateral direction, and an expansion spring arranged on each of the other bolts between said end members for causing them to spread apart when said bolts are loosened and release said tubular member and a disk of porous filtering material secured within said tubular member in spaced-apart relation with the ends thereof.

6. A filter comprising an inlet end member, a plurality of outwardly projecting lugs formed integral therewith, an outlet end member, a plurality of outwardly projecting lugs formed integral therewith, an open-ended tubular member interposed between said end members, a mass of filter material secured within said tubular member, a plurality of bolts engaging said lugs and forcing said end members into fluid-tight engagement with the ends of said tubular member, said bolts being operable to release said end members, and one of said bolts being removable to permit removal of said tubular member in a lateral direction, and expansion spring means interposed between said end members to cause the latter to spread apart when said bolts are loosened to facilitate the removal of said tubular member.

7. A filter comprising an inlet end member, a plurality of outwardly projecting lugs formed integral therewith, an outlet end member, a plurality of outwardly projecting lugs formed integral therewith, an open-ended tubular member interposed between said end members, a mass of filter material secured within said tubular member, a plurality of bolts engaging said lugs and forcing said end members into fluid-tight engagement with the ends of said tubular member, said bolts being operable to release said end members and one of said bolts being removable to permit removal of said tubular member in a lateral direction, and an expansion coiled spring arranged on certain of said bolts between said end members and in spaced-apart relationship with said removable bolt to cause said end members to spread apart when said bolts are loosened so as to release said tubular member and facilitate the removal thereof.

8. A filter comprising a lower end member having an upward cylindrical extension, an inlet connection leading into said extension, an upper end member, an outlet connection leading therefrom, an open-ended tubular member interposed between said end member and said cylindrical extension, a mass of filtering material fixed within said tubular member, means for securing said end members and said tubular member together in fluid-tight engagement with each other, and a plurality of discharge nozzles disposed horizontally within said extension and connected to said inlet connection, said nozzles being curved in one direction to impart to the fluid discharged therefrom whirling motion in said cylindrical extension.

9. A filter comprising an inlet end member having a cylindrical upper extension, an outlet end member, an open-ended tubular member removably interposed between said outlet end member and said cylindrical extension, means for securing said members together in fluid-tight engagement, a disk of stone-like porous material arranged in said tubular member in spaced-apart relation with the ends thereof, an inlet connection extending into said cylindrical extension, and a plurality of discharge nozzles disposed horizontally within said extension and connected to said inlet connection, said discharge nozzles being curved in one direction to impart whirling motion to the fluid discharged within said extension so as to separate by centrifugal motion moisture contained in said gaseous fluid preliminary to the passages of said fluid through said filtering disk, and a drain connection leading outwardly from said inlet end member.

10. A filter comprising an inlet end member having a cylindrical upper extension, an outlet end member, an open-ended tubular member removably interposed between said outlet end member and said cylindrical extension, a disk of stone-like filtering material arranged in said tubular member, means for securing said members together in fluid-tight engagement, an inlet connection extending into said cylindrical extension, a plurality of discharge nozzles disposed horizontally within said extension and connected to said inlet connection, said discharge nozzles being curved in one direction to impart whirling motion to the fluid discharged within said extension so as to separate by centrifugal motion moisture contained in said gaseous fluid preliminary to the passage of said fluid through said filtering disk, a drain connection leading outwardly from said inlet end member, and longitudinally disposed corrugated surfaces arranged peripherally within said cylindrical extension for collecting the moisture contained in the gaseous fluid discharged from said nozzles.

11. A filter comprising a lower end member having an upward cylindrical extension, an inlet connection leading into said extension, an upper end member, an outlet connection leading therefrom, an open-ended tubular member interposed between said upper end member and said cylindrical extension, a mass of filtering material fixed within said tubular member, means for drawing said upper end member and said cylindrical extension toward each other and clamping said tubular member in fluid-tight connection therewith, a plurality of discharge nozzles disposed horizontally within said cylindrical extension and connected to said inlet connection, said nozzles being curved in one direction to impart to the gaseous fluid discharged therefrom whirling motion whereby moisture contained therein is partially separated therefrom by centrifugal action, and a lining member inserted in said cylindrical extension and provided with longitudinally disposed corrugations for effecting the collection of the moisture.

EMIL F. WEMHOENER.